US012167195B2

(12) United States Patent
Innes-Brown et al.

(10) Patent No.: US 12,167,195 B2
(45) Date of Patent: Dec. 10, 2024

(54) HEARING DEVICE OR SYSTEM COMPRISING A NOISE CONTROL SYSTEM

(71) Applicant: Oticon A/S, Smørum (DK)

(72) Inventors: Hamish Innes-Brown, Smørum (DK); Martha Shiell, Smørum (DK); Michael Syskind Pedersen, Smørum (DK)

(73) Assignee: Oticon A/S, Smørum (DK)

( * ) Notice: Subject to any disclaimer, the term of this patent is extended or adjusted under 35 U.S.C. 154(b) by 212 days.

(21) Appl. No.: 17/981,656

(22) Filed: Nov. 7, 2022

(65) Prior Publication Data

US 2023/0143325 A1 May 11, 2023

(30) Foreign Application Priority Data

Nov. 8, 2021 (EP) .................................... 21206828

(51) Int. Cl.
*H04R 1/10* (2006.01)
*G10K 11/178* (2006.01)
*H04R 3/00* (2006.01)

(52) U.S. Cl.
CPC ..... *H04R 1/1083* (2013.01); *G10K 11/17854* (2018.01); *G10K 11/17881* (2018.01); *H04R 3/005* (2013.01); *G10K 2210/1081* (2013.01); *H04R 2410/05* (2013.01); *H04R 2460/01* (2013.01)

(58) Field of Classification Search
None
See application file for complete search history.

(56) References Cited

U.S. PATENT DOCUMENTS

2016/0241974 A1* 8/2016 Jensen ................. H04R 25/505
2018/0184213 A1* 6/2018 Lesimple ............. H04R 25/356

FOREIGN PATENT DOCUMENTS

EP 2701145 A1 2/2014
JP 2010-200260 A 9/2010

OTHER PUBLICATIONS

Christopher Schweitzer, "Development of Digital Hearing Aids", Trends in Amplification, 1997, vol. 2, No. 2, p. 41-77.

(Continued)

*Primary Examiner* — Kenny H Truong
(74) *Attorney, Agent, or Firm* — Birch, Stewart, Kolasch & Birch, LLP

(57) ABSTRACT

A hearing system comprises a hearing device, e.g. a hearing aid or a headset, configured to be worn by a user. The hearing device comprises at least one input transducer for providing at least one electric input signal representative of sound in the environment of the hearing device, wherein said at least one electric input signal comprises a target signal component assumed to be of current interest to the user, and a noise component. The hearing device further comprises a noise control system configured to provide an estimate of said target signal component and an estimate of said noise component and to apply a statistical structure to said noise component to thereby provide a modified noise component comprising said statistical structure; and to determine a modified estimate of said target signal component in dependence of said modified noise component. Thereby an improved segregation of sound sources may be provided.

20 Claims, 5 Drawing Sheets

(56) References Cited

OTHER PUBLICATIONS

McDermott et al., "Sound Texture Perception via Statistics of the Auditory Periphery: Evidence from Sound Synthesis", Neuron, Elsevier, Amsterdam, NL, Jun. 27, 2011, vol. 71, No. 5, p. 926-940.
Search Report issued in European priority application 21206828.2, dated May 3, 2022.
William A. Yost, "Auditory Image Perception and Amplitude Modulation: Frequency and Intensity Discrimination of Individual Components for Amplitude-modulated Two-tone Complexes", Advances in the Biosciences, 1992, vol. 83, p. 487-494.

* cited by examiner

Estimated and true coherence function
(cylindrical isotropic noise field)

Estimated and true coherence function
(spherical isotropic noise field)

HEARING DEVICE OR SYSTEM COMPRISING A NOISE CONTROL SYSTEM

TECHNICAL FIELD

The present disclosure relates to the field of hearing devices, e.g. hearing aids or headsets or combinations thereof, in particular to noise control.

In the present disclosure, we use the following terms in relation to the acoustic and auditory environment:

'Physical sources' are physical objects or elements in the environment which generate sound signals.

'Sound signals' are generated by sources (usually by a physical object/person but can also by a diffuse background sound signal).

'Auditory scene' is the complex mix of sound signals generated by multiple physical sources.

'Auditory objects' are the percepts that the brain builds, by un-mixing the sound signals according to their spectro-temporal co-modulations (see below).

This present disclosure has been inspired by new basic knowledge on how the brain separates the auditory foreground from background. After sound signals pass through the ears and the peripheral sensory system, the brain has to segregate and integrate different parts of the auditory scene in order to form a representation that can be interpreted—a process that is referred to as object formation. Object formation is thought to be enabled by the detection of the statistical regularities (i.e. patterns) that are present in the spectro-temporal features of sound signals that are generated by distinct physical sources. Interestingly, research indicates that the more statistical regularity there is in the auditory scene, the more clearly auditory objects are formed (cf. e.g. [Aman et al.; 2021]). This improvement is produced not only in response to the statistical regularity of sound signals generated by the target, but also in response to statistical regularity in the sound signals generated by the background.

The term 'sound textures' is in the present context taken to mean sounds produced by the addition of many similar sound sources, such as the sound of a room full of people talking, or a swarm of bees, or of raindrops (cf. e.g. [McWalter & McDermott; 2019]). These sound textures tend to be stable over fairly long periods of time and, although they are complex in the sense that they are formed from many individual sources, they tend to be perceived as a single 'background' sound. In addition, sound textures can be characterized by low-order summary statistics (such as the between-channel correlations when the signal is passed through a filter bank of an auditory processing model) and can even synthesized by imposing these simple statistics on noise (cf. e.g. [McDermott & Simoncelli; 2011]).

Further, the interaction of sound signals with the listening space (e.g. a room) itself, and how those sound signals are transduced and perceived binaurally also affects object formation processes. For example, sound signals from physical sources that are located close to the listener take a direct path to both ears, and hence the signals received at each ear are highly correlated. Sound signals produced by physical sources that are located further away tend to be reflected and diffused by the room more and are less correlated at the two ears. The correlation between the two ears is known as the inter-aural coherence (IAC). Sounds with high IAC tend to be perceived as small, distinct sources, and sounds with low IAC tend to be perceived as more diffused or background sound. In the present context, the term 'perceived as small' is taken to mean 'small in perceived size'. An example may e.g. be a single distinct source, rather than a diffuse source, may be 'perceived as small'. A 'small single distinct source' may e.g. be a person talking nearby; a 'diffuse source' may e.g. be the sound of the announcement at a train station.

Finally, it is known that the brain uses statistical regularities, both in a monaural sense (as with the sound textures) as well as in a binaural sense (as with IAC) to help generate auditory objects. When statistically regular signals are compared to non-regular signals in experiments, listeners are generally slower and less accurate in detecting auditory objects (cf e g [Aman et al.; 2021]).

[McDermott & Simoncelli; 2011] mentions the "superposition of many similar acoustic events" as a definition for what a sound texture is.

JP2010200260A relates to binaural hearing aid system and proposes to add internally generated noise to sound amplified by a forward path of a hearing aid of a contralateral ear. In some cases, this may make speech understanding in the ipsilateral ear easier.

SUMMARY

In people with normal hearing and in relatively uncomplicated auditory environments, object formation happens automatically. The statistical regularities described above are transduced and encoded accurately by the peripheral auditory system, and the brain is able to integrate the signals into their summary statistics over short periods of time and with high reliability. As the environment gets noisier though, it gets harder for the brain to make auditory objects: Sound signals from competing physical sound sources increasingly get mixed in with sound signals generated by the target source. The increasing difficulty of extracting auditory objects from complex acoustic environments can happen when there are competing sound signals generated by multiple distinct sources (e.g. two simultaneous talkers). In this case the multiple sound signals may each have high statistical regularity but have different acoustic properties. Difficulty extracting auditory objects can also happen when there are competing sound signals which have interacted significantly with the listening space and have become highly diffuse and irregular (e.g. one talker with the background of a noisy canteen).

Current hearing aid technology typically deals with background noise by directional attenuation. This improves the listening experience by reducing energetic masking of the target sounds by a spatially separated distractor but comes at the cost of reducing the listeners' access to the full auditory scene. If the statistical properties of the background sound are disturbed or modulated unpredictably by hearing aid processing, it is possible that the brain may need a longer integration time in order to reliably capture the summary statistics, and it may therefore be more difficult to segregate foreground from background. For this reason, there may be limitations in the degree to which directional attenuation can help (e.g. hearing impaired) listener's that are struggling in noisy environments.

In the present disclosure, it is proposed to create sound textures (or auditory textures) for a specific purpose, sound segregation, e.g. in the context of hearing aid technology. It is proposed to combine such sound textures (or auditory textures) with an estimate of noise components in a target signal. Throughout the present disclosure, the terms 'sound texture' and 'auditory texture' are used interchangeably without any intended difference in meaning.

Throughout the present disclosure and in the context of the noise control system, reference to 'the noise component' is intended to mean 'the estimate of the noise component'.

A First Hearing System:

In an aspect of the present application, a hearing system comprising a hearing device configured to be worn by a user is provided. The hearing device, e.g. a hearing aid, comprises At least one input transducer for providing at least one electric input signal representative of sound in the environment of the hearing device, wherein said at least one electric input signal comprises a) a target signal component assumed to be of current interest to the user, and b) a noise component;

An output unit configured to provide an output signal based on said at least one electric input signal, either comprising stimuli for being presented to the user, and/or for being transmitted to another device;

A noise control system configured to provide an estimate of said target signal component and an estimate of said noise component in said at least one electric input signal, or in a signal originating therefrom.

The noise control system may further be configured to apply a statistical structure to (said estimate of) said noise component to thereby provide a modified noise component comprising said statistical structure; and to determine a modified estimate of said target signal component in dependence of said modified noise component.

The output signal may comprise the modified estimate of said target signal component, or a further processed version thereof.

The at least one input transducer may comprise an acoustic to electric transducer, e.g. a microphone or a vibration sensor. The acoustic to electric transducer may be configured to provide an electric input signal comprising sound from the environment of the user wearing the hearing system (e.g. the hearing device). The at least one input transducer may comprise an audio receiver, e.g. a wireless audio receiver. The audio receiver may be configured to provide an electric input signal representing sound received from another device or system (e.g. from a far end speaker of a telephone conversation, or from an another audio delivery device).

A Second Hearing System:

In a further aspect of the present application, a hearing system comprising a hearing device configured to be worn by a user is provided. The hearing device (e.g. a hearing aid) comprises At least two input transducers configured to provide respective at least two electric input signals representative of sound, wherein at least one of said at least two electric input signals comprises a) a target signal component assumed to be of current interest to the user, and wherein at least one of said at least two electric input signals comprises b) a noise component;

An output unit configured to provide an output signal independence of said at least two electric input signals, either comprising stimuli for being presented to the user, and/or for being transmitted to another device.

The hearing device further comprises

A noise control system configured to provide an estimate of said target signal component and an estimate of said noise component in said at least two electric input signals, or in a signal or signals originating therefrom.

The noise control system may further be configured to apply a statistical structure to (said estimate of) said noise component to thereby provide a modified noise component comprising said statistical structure; and to determine a modified estimate of said target signal component in dependence of said modified noise component, and wherein said output signal comprises said modified estimate of said target signal component, or a further processed version thereof.

The at least two input transducers may comprise an acoustic to electric transducer, e.g. a microphone or a vibration sensor. The acoustic to electric transducer may be configured to provide an electric input signal comprising sound from the environment of the user wearing the hearing system (e.g. the hearing device). The at least two input transducers may comprise at least two acoustic to electric transducers, e.g. microphones and/or vibration sensors. The at least two input transducers may comprise an audio receiver, e.g. a wireless audio receiver. The audio receiver may be configured to provide an electric input signal representing sound received from another device or system (e.g. from a far end speaker of a telephone conversation, or from an another audio delivery device).

The target signal component may originate from the electric input signal provided by the audio receiver. At least a part (e.g. all) of the noise component may originate from the electric input signal provided by the (at least one) acoustic to electric transducer.

The target signal component may originate from the electric input signal provided by one of the (at least one) acoustic to electric transducers. At least a part (e.g. all) of the noise component may originate from the electric input signal provided by another one of the (at least one) acoustic to electric transducers.

The following properties and features are intended be common to the first and second hearing systems.

Thereby an improved segregation of sound sources may be provided in a hearing device or a hearing system. The aim of the modification of the noise component and the target signal component presented to the user by the hearing device is to 'enhance the noise signal' to make it more perceptually coherent and allow the brain to classify it as 'background' (to thereby better be able to segregate the target signal from the background noise).

The modulation may e.g. be amplitude modulation. The modulation may e.g. be frequency modulation. The phase of the noise component may be randomized.

The statistical structure may be constituted by or comprise auditory texture in the form of sounds produced by the combination (e.g. addition) of a multitude of similar sound sources. The statistical structure is preferably perceptible, at least when applied to (e.g. modulated onto) the estimate of the noise component, termed 'the noise estimate' (of the current electric input signal(s)). The statistical structure may for example be constituted by or comprise 'auditory texture'. 'Auditory textures' may e.g. comprise sounds produced by the addition of a multitude of similar sound sources, such as the sound of a room full of people talking, or a swarm of bees, or of raindrops, or waves of the sea. A multitude of similar sound sources may e.g. be at least three, e.g. at least five, e.g. at least ten. A sound source may e.g. be a person, a bee, a raindrop, a wave, etc.

The application of a statistical structure to a noise component of a noisy target signal may resemble a tinnitus masker. Tinnitus masking sounds have a similar functionality, namely to play a sound which masks or removes the listener's attention to the more unpleasant tonal sound. Tinnitus maskers may have a similar statistical structure (white noise, natural sounds like rain, waves (e.g. of the sea), etc.) as the statistical structures according to the present disclosure.

Synthetic auditory sound textures can be generated in a two-step process. First, time-averaged summary statistics can be measured from real-world textures using an auditory texture model such as that published by [McWalter and McDermott; 2018]. Normally, in a second step, these summary statistics are then imposed on gaussian noise, resulting in a synthetic sound that is often perceived as having the same identity as the real sound texture that the summary statistics were measured from. In an embodiment of the present disclosure, these summary statistics are instead imposed to the noise signal in the hearing aid.

Auditory texture models produce summary statistics by processing a given input sound through a variety of filtering steps inspired by knowledge of the human auditory system. The input signal is filtered into a number of frequency bands, and then the envelopes and modulation envelopes are extracted within each band. Statistics such as the mean, coefficient of variance, skewness and correlations in these statistics between bands of both the amplitude envelopes and modulation envelopes are calculated. [McDermott and Simoncelli; 2011)] showed that the between-band correlations between both the amplitude and modulation envelopes were the most relevant summary statistics in terms of generating reliable percepts when those statistics were imposed on noise.

The measurement of the summary statistics may be performed offline to produce a database of summary statistics that tend to induce the perception of various classes of real-world sound textures.

The statistical structure is constituted by or comprises amplitude modulation in a rhythmic pattern. In other words, the statistical regularity may come from repeating a pattern of amplitude-modulation over time. The pattern may be accomplished across many different manipulations of the sound (e.g. how long the pattern takes before repeating, the min/max duration between the up/down and down/up segments of the amplitude modulation, the min/max levels in amplitude of the amplitude modulation), etc. A single repetition of the pattern may e.g. be less than 5 seconds in duration. No up-segment may e.g. last longer than 2 seconds. No down-segment may e.g. last longer than 1 second.

The at least one input transducer may comprise a multitude of input transducers, each providing an electric input signal representative of sound in the environment of the hearing device, and wherein said noise control system comprises a directional system comprising at least one beamformer configured to receive as inputs said multitude of electric input signals, or signals originating therefrom, and to provide an estimate of said target signal component in dependence of said inputs and predefined or adaptively updated beamformer weights. The number of inputs to the at least one beamformer may be two (or more, e.g. three or more). At least one, e.g. two, or all, of the at least one input transducer may comprise a microphone (e.g. a MEMS microphone). The directional system (i.e. the at least one beamformer) may comprise a plurality of beamformers, e.g. two or more. The beamformer weights of one or more, such as all, of the at least one beamformer may be time-invariant. The beamformer weights of one or more, such as all, of the at least one beamformer may be time-variant, e.g. adaptively determined in dependence of the inputs to the at least one beamformer. The plurality of beamformers may comprise a target maintaining beamformer including an estimate of the target signal component and/or a target cancelling beamformer including an estimate of the noise component.

The directional system may comprise a linear constraint minimum variance (LCMV) beamformer. The directional system may comprise a generalized sidelobe canceller (GSC) beamformer. The directional system may comprise a minimum variance distortionless response (MVDR) beamformer.

The at least one beamformer may comprise first and second beamformers, wherein said first beamformer comprises said target signal component, and wherein said second beamformer is a target-cancelling beamformer comprising said noise component.

The statistical structure may be applied to the noise component

- in that the statistical structure is added directly to the noise component (i.e. the noise component itself is modified); and/or
- in that the statistical structure is added to the noise component in combination with other processing done on the noise component; and/or
- in that the statistical structure is added to the noise component and added to the output signal, after the original noise component provided by the second beamformer has been removed from the target signal component signal provided by the first beamformer.

The statistical structure may be added directly to the noise component (i.e. the noise component itself is modified). The statistical structure may be added to the noise component in combination with other processing done on the noise component, e.g. the processing that allows this component to be removed from the "full scene" signal (provided by the first beamformer), which is the multiplication by an adaptive parameter (β). The statistical structure may be added to the noise component and both may be added to the output signal, after the original noise component has been removed from the "full scene" signal (provided by the first beamformer).

The hearing system may comprise at least one analysis filter bank for providing said at least one electric input signal in a time frequency representation (k,l), where (k,l) represents a time-frequency tile, and k is a frequency index and l is a time index. The hearing system may comprise an analysis filter bank for each of the at least one electric input signals. The term time-frequency tile (k,l) may alternatively be denoted time frequency bin or time frequency unit and represents a (typically) complex value of the signal in a time-frequency representation at a specific time (e.g. time frame index l) and frequency (e.g. frequency band index k). The time-frequency tile (k,l) may e.g. represent an output value of a Fourier transform algorithm of the order K (k=1, . . . , K) at time l and frequency k.

Auditory texture may be added to time-frequency regions that are attenuated in the noise reduction stage (e.g. in the noise control system) of the hearing device. Normally, the noise reduction system finds time-frequency regions in the signal where the noise is more energetic than the target signal, and then attenuates those regions by a small amount (for example 7 dB) in order to avoid introducing 'musical tones' that occur with more aggressive noise attenuation. It is proposed to attenuate noisy regions more aggressively, e.g. attenuating by 20 dB, but also to add 'textured' background noise to the specific time-frequency units that are attenuated. In that way a more pleasant background noise, without audible artefacts, may be obtained for presentation to the listener.

In the case where noise is only added to low-SNR or level regions in time and in frequency, it may only be beneficial to add noise, if the number of noisy regions is high (e.g. where a minimum number of noisy regions are needed in order to allow the added noise to group together).

The hearing system may comprise an auxiliary device wherein a part of the processing of the hearing system is performed.

The hearing system may be constituted by the hearing device.

The hearing device may be constituted by or comprise a hearing aid, or first and second hearing aids of a binaural hearing aid system, or a headset, or a combination thereof. The hearing aid may be an air-conduction type hearing aid, a bone-conduction type hearing aid, a cochlear implant type hearing aid, or a combination thereof. The headset may comprise one or two earpieces configured to be located at or in an ear, or at or in left and right ears, respectively, of the user.

The hearing system may comprise a further hearing device, wherein the hearing device and the further hearing device each comprise appropriate antenna and transceiver circuitry allowing them to exchange data, either directly or via an auxiliary device. Thereby the hearing system may be configured as a binaural hearing system, e.g. a binaural hearing aid system (or a headset comprising first and second ear pieces).

The hearing system may be configured to provide that the phase of the complex time frequency tile of the at least one analysis filter bank of a given hearing device may be altered by multiplying the at least one electric input signal with a random or a pseudorandom phase. The at least one electric input signal may e.g. be multiplied by a multiplication factor of $\exp(i\varphi)$, where $i=\sqrt{-1}$. The phase $\varphi$ may e.g. be a altered such that the noise will appear from a different direction than the target. The phase may also be randomized such that the noise field becomes diffuse. This can be obtained for each device of the binaural hearing system by drawing the angle $\varphi$ from a different random distribution (where the maximum and the minimum $\varphi$ corresponds to the maximum possible delay depending on the microphone distance.

The hearing aid may be adapted to provide a frequency dependent gain and/or a level dependent compression and/or a transposition (with or without frequency compression) of one or more frequency ranges to one or more other frequency ranges, e.g. to compensate for a hearing impairment of a user. The hearing aid may comprise a signal processor for enhancing the input signals and providing a processed output signal.

The hearing aid may comprise an output unit for providing a stimulus perceived by the user as an acoustic signal based on a processed electric signal. The output unit may comprise a number of electrodes of a cochlear implant (for a CI type hearing aid) or a vibrator of a bone conducting hearing aid. The output unit may comprise an output transducer. The output transducer may comprise a receiver (loudspeaker) for providing the stimulus as an acoustic signal to the user (e.g. in an acoustic (air conduction based) hearing aid). The output transducer may comprise a vibrator for providing the stimulus as mechanical vibration of a skull bone to the user (e.g. in a bone-attached or bone-anchored hearing aid). The output unit may (additionally or alternatively) comprise a transmitter for transmitting sound picked up-by the hearing aid to another device, e.g. a far-end communication partner (e.g. via a network, e.g. in a telephone mode of operation, or in a headset configuration).

The hearing aid may comprise an input unit for providing an electric input signal representing sound. The input unit may comprise an input transducer, e.g. a microphone, for converting an input sound to an electric input signal. The input unit may comprise a wireless receiver for receiving a wireless signal comprising or representing sound and for providing an electric input signal representing said sound.

The wireless receiver and/or transmitter may e.g. be configured to receive and/or transmit an electromagnetic signal in the radio frequency range (3 kHz to 300 GHz). The wireless receiver and/or transmitter may e.g. be configured to receive and/or transmit an electromagnetic signal in a frequency range of light (e.g. infrared light 300 GHz to 430 THz, or visible light, e.g. 430 THz to 770 THz).

The hearing aid may comprise a directional microphone system adapted to spatially filter sounds from the environment, and thereby enhance a target acoustic source among a multitude of acoustic sources in the local environment of the user wearing the hearing aid. The directional system may be adapted to detect (such as adaptively detect) from which direction a particular part of the microphone signal originates. This can be achieved in various different ways as e.g. described in the prior art. In hearing aids, a microphone array beamformer is often used for spatially attenuating background noise sources. The beamformer may comprise a linear constraint minimum variance (LCMV) beamformer. Many beamformer variants can be found in literature. The minimum variance distortionless response (MVDR) beamformer is widely used in microphone array signal processing. Ideally the MVDR beamformer keeps the signals from the target direction (also referred to as the look direction) unchanged, while attenuating sound signals from other directions maximally. The generalized sidelobe canceller (GSC) structure is an equivalent representation of the MVDR beamformer offering computational and numerical advantages over a direct implementation in its original form.

The hearing aid may comprise antenna and transceiver circuitry allowing a wireless link to an entertainment device (e.g. a TV-set), a communication device (e.g. a telephone), a wireless microphone, or another hearing aid, etc. The hearing aid may thus be configured to wirelessly receive a direct electric input signal from another device. Likewise, the hearing aid may be configured to wirelessly transmit a direct electric output signal to another device. The direct electric input or output signal may represent or comprise an audio signal and/or a control signal and/or an information signal.

In general, a wireless link established by antenna and transceiver circuitry of the hearing aid can be of any type. The wireless link may be a link based on near-field communication, e.g. an inductive link based on an inductive coupling between antenna coils of transmitter and receiver parts. The wireless link may be based on far-field, electromagnetic radiation. Preferably, frequencies used to establish a communication link between the hearing aid and the other device is below 70 GHz, e.g. located in a range from 50 MHz to 70 GHz, e.g. above 300 MHz, e.g. in an ISM range above 300 MHz, e.g. in the 900 MHz range or in the 2.4 GHz range or in the 5.8 GHz range or in the 60 GHz range (ISM=Industrial, Scientific and Medical, such standardized ranges being e.g. defined by the International Telecommunication Union, ITU). The wireless link may be based on a standardized or proprietary technology. The wireless link may be based on Bluetooth technology (e.g. Bluetooth Low-Energy technology, such as LE Audio), or Ultra WideBand (UWB) technology.

The hearing aid may be or form part of a portable (i.e. configured to be wearable) device, e.g. a device comprising a local energy source, e.g. a battery, e.g. a rechargeable battery. The hearing aid may e.g. be a low weight, easily wearable, device, e.g. having a total weight less than 100 g, such as less than 20 g.

The hearing aid may comprise a 'forward' (or 'signal') path for processing an audio signal between an input and an output of the hearing aid. A signal processor may be located in the forward path. The signal processor may be adapted to provide a frequency dependent gain according to a user's particular needs (e.g. hearing impairment). The hearing aid may comprise an 'analysis' path comprising functional components for analyzing signals and/or controlling processing of the forward path. Some or all signal processing of the analysis path and/or the forward path may be conducted in the frequency domain, in which case the hearing aid comprises appropriate analysis and synthesis filter banks. Some or all signal processing of the analysis path and/or the forward path may be conducted in the time domain.

An analogue electric signal representing an acoustic signal may be converted to a digital audio signal in an analogue-to-digital (AD) conversion process, where the analogue signal is sampled with a predefined sampling frequency or rate $f_s$, $f_s$ being e.g. in the range from 8 kHz to 48 kHz (adapted to the particular needs of the application) to provide digital samples $x_n$, (or x[n]) at discrete points in time $t_n$ (or n), each audio sample representing the value of the acoustic signal at $t_n$ by a predefined number $N_b$ of bits, $N_b$ being e.g. in the range from 1 to 48 bits, e.g. 24 bits. Each audio sample is hence quantized using $N_b$ bits (resulting in $2^{Nb}$ different possible values of the audio sample). A digital sample x has a length in time of $1/f_s$, e.g. 50 μs, for $f_s$=20 kHz. A number of audio samples may be arranged in a time frame. A time frame may comprise 64 or 128 audio data samples. Other frame lengths may be used depending on the practical application.

The hearing aid may comprise an analogue-to-digital (AD) converter to digitize an analogue input (e.g. from an input transducer, such as a microphone) with a predefined sampling rate, e.g. 20 kHz. The hearing aids may comprise a digital-to-analogue (DA) converter to convert a digital signal to an analogue output signal, e.g. for being presented to a user via an output transducer.

The hearing aid, e.g. the input unit, and or the antenna and transceiver circuitry may comprise a transform unit for converting a time domain signal to a signal in the transform domain (e g frequency domain or Laplace domain, etc.). The transform unit may be constituted by or comprise a TF-conversion unit for providing a time-frequency representation of an input signal. The time-frequency representation may comprise an array or map of corresponding complex or real values of the signal in question in a particular time and frequency range. The TF conversion unit may comprise a filter bank for filtering a (time varying) input signal and providing a number of (time varying) output signals each comprising a distinct frequency range of the input signal. The TF conversion unit may comprise a Fourier transformation unit (e.g. a Discrete Fourier Transform (DFT) algorithm, or a Short Time Fourier Transform (STFT) algorithm, or similar) for converting a time variant input signal to a (time variant) signal in the (time-)frequency domain. The frequency range considered by the hearing aid from a minimum frequency $f_{min}$ to a maximum frequency $f_{max}$ may comprise a part of the typical human audible frequency range from 20 Hz to 20 kHz, e.g. a part of the range from 20 Hz to 12 kHz. Typically, a sample rate $f_s$ is larger than or equal to twice the maximum frequency $f_{max}$, $f_s \geq 2f_{max}$. A signal of the forward and/or analysis path of the hearing aid may be split into a number NI of frequency bands (e.g. of uniform width), where NI is e.g. larger than 5, such as larger than 10, such as larger than 50, such as larger than 100, such as larger than 500, at least some of which are processed individually. The hearing aid may be adapted to process a signal of the forward and/or analysis path in a number NP of different frequency channels (NP≤NI). The frequency channels may be uniform or non-uniform in width (e.g. increasing in width with frequency), overlapping or non-overlapping.

The hearing aid may comprise a number of detectors configured to provide status signals relating to a current physical environment of the hearing aid (e.g. the current acoustic environment), and/or to a current state of the user wearing the hearing aid, and/or to a current state or mode of operation of the hearing aid. Alternatively or additionally, one or more detectors may form part of an external device in communication (e.g. wirelessly) with the hearing aid. An external device may e.g. comprise another hearing aid, a remote control, and audio delivery device, a telephone (e.g. a smartphone), an external sensor, etc.

One or more of the number of detectors may operate on the full band signal (time domain) One or more of the number of detectors may operate on band split signals ((time-) frequency domain), e.g. in a limited number of frequency bands.

The number of detectors may comprise a level detector for estimating a current level of a signal of the forward path. The detector may be configured to decide whether the current level of a signal of the forward path is above or below a given (L-)threshold value. The level detector operates on the full band signal (time domain). The level detector operates on band split signals ((time-) frequency domain).

The hearing aid may comprise a voice activity detector (VAD) for estimating whether or not (or with what probability) an input signal comprises a voice signal (at a given point in time). A voice signal may in the present context be taken to include a speech signal from a human being. It may also include other forms of utterances generated by the human speech system (e.g. singing). The voice activity detector unit may be adapted to classify a current acoustic environment of the user as a VOICE or NO-VOICE environment. This has the advantage that time segments of the electric microphone signal comprising human utterances (e.g. speech) in the user's environment can be identified, and thus separated from time segments only (or mainly) comprising other sound sources (e.g. artificially generated noise). The voice activity detector may be adapted to detect as a VOICE also the user's own voice. Alternatively, the voice activity detector may be adapted to exclude a user's own voice from the detection of a VOICE.

The hearing aid may comprise an own voice detector for estimating whether or not (or with what probability) a given input sound (e.g. a voice, e.g. speech) originates from the voice of the user of the system. A microphone system of the hearing aid may be adapted to be able to differentiate between a user's own voice and another person's voice and possibly from NON-voice sounds.

The number of detectors may comprise a movement detector, e.g. an acceleration sensor. The movement detector may be configured to detect movement of the user's facial muscles and/or bones, e.g. due to speech or chewing (e.g. jaw movement) and to provide a detector signal indicative thereof.

The hearing aid may comprise a classification unit configured to classify the current situation based on input signals from (at least some of) the detectors, and possibly other inputs as well. In the present context 'a current situation' may be taken to be defined by one or more of a) the physical environment (e.g. including the current electromagnetic environment, e.g. the occurrence of electromagnetic signals (e.g. comprising audio and/or control signals) intended or not intended for reception by the hearing aid, or other properties of the current environment than acoustic);

b) the current acoustic situation (input level, feedback, etc.), and c) the current mode or state of the user (movement, temperature, cognitive load, etc.);

d) the current mode or state of the hearing aid (program selected, time elapsed since last user interaction, etc.) and/or of another device in communication with the hearing aid.

The classification unit may be based on or comprise a neural network, e.g. a trained neural network.

The hearing aid may comprise an acoustic (and/or mechanical) feedback control (e.g. suppression) or echo-cancelling system. Adaptive feedback cancellation has the ability to track feedback path changes over time. It is typically based on a linear time invariant filter to estimate the feedback path but its filter weights are updated over time. The filter update may be calculated using stochastic gradient algorithms, including some form of the Least Mean Square (LMS) or the Normalized LMS (NLMS) algorithms. They both have the property to minimize the error signal in the mean square sense with the NLMS additionally normalizing the filter update with respect to the squared Euclidean norm of some reference signal.

The hearing aid may further comprise other relevant functionality for the application in question, e.g. compression, noise reduction, etc.

The hearing aid may comprise a hearing instrument, e.g. a hearing instrument adapted for being located at the ear or fully or partially in the ear canal of a user, e.g. a headset, an earphone, an ear protection device or a combination thereof. A hearing system may comprise a speakerphone (comprising a number of input transducers and a number of output transducers, e.g. for use in an audio conference situation), e.g. comprising a beamformer filtering unit, e.g. providing multiple beamforming capabilities.

Use:

In an aspect, use of a hearing aid as described above, in the 'detailed description of embodiments' and in the claims, is moreover provided. Use may be provided in a system comprising one or more hearing aids (e.g. hearing instruments), headsets, ear phones, active ear protection systems, etc., e.g. in handsfree telephone systems, teleconferencing systems (e.g. including a speakerphone), public address systems, karaoke systems, classroom amplification systems, etc.

A method:

In an aspect, a method of operating a hearing system comprising a hearing device configured to be worn by a user is furthermore provided by the present application. The method comprises providing at least one electric input signal representative of sound in the environment of the hearing device, wherein said at least one electric input signal comprises a) a target signal component assumed to be of current interest to the user, and b) a noise component;

providing an output signal based on said at least one electric input signal, either comprising stimuli for being presented to the user, and/or for being transmitted to another device;

providing an estimate of said target signal component and an estimate of said noise component in said at least one electric input signal, or in a signal originating therefrom.

The method may further comprise applying a statistical structure to said noise component to thereby provide a modified noise component comprising said statistical structure; and determining a modified estimate of said target signal component in dependence of said modified noise component, and providing that said output signal comprises said modified estimate of said target signal component, or a further processed version thereof.

It is intended that some or all of the structural features of the device described above, in the 'detailed description of embodiments' or in the claims can be combined with embodiments of the method, when appropriately substituted by a corresponding process and vice versa. Embodiments of the method have the same advantages as the corresponding devices.

A Computer Readable Medium or Data Carrier:

In an aspect, a tangible computer-readable medium (a data carrier) storing a computer program comprising program code means (instructions) for causing a data processing system (a computer) to perform (carry out) at least some (such as a majority or all) of the (steps of the) method described above, in the 'detailed description of embodiments' and in the claims, when said computer program is executed on the data processing system is furthermore provided by the present application.

By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Other storage media include storage in DNA (e.g. in synthesized DNA strands). Combinations of the above should also be included within the scope of computer-readable media. In addition to being stored on a tangible medium, the computer program can also be transmitted via a transmission medium such as a wired or wireless link or a network, e.g. the Internet, and loaded into a data processing system for being executed at a location different from that of the tangible medium.

A Computer Program:

A computer program (product) comprising instructions which, when the program is executed by a computer, cause the computer to carry out (steps of) the method described above, in the 'detailed description of embodiments' and in the claims is furthermore provided by the present application.

A Data Processing System:

In an aspect, a data processing system comprising a processor and program code means for causing the processor to perform at least some (such as a majority or all) of the steps of the method described above, in the 'detailed description of embodiments' and in the claims is furthermore provided by the present application.

A Further Hearing System:

In a further aspect, a further hearing system comprising a hearing device, e.g. a hearing aid, as described above, in the 'detailed description of embodiments', and in the claims (first or second hearing systems), AND an auxiliary device is moreover provided.

The further hearing system may be adapted to establish a communication link between the hearing aid and the auxiliary device to provide that information (e.g. control and status signals, possibly audio signals) can be exchanged or forwarded from one to the other.

The auxiliary device may comprise a remote control, a smartphone, or other portable or wearable electronic device, such as a smartwatch or the like.

The auxiliary device may be constituted by or comprise a remote control for controlling functionality and operation of the hearing aid(s). The function of a remote control may be implemented in a smartphone, the smartphone possibly running an APP allowing to control the functionality of the hearing device via the smartphone (the hearing aid(s) comprising an appropriate wireless interface to the smartphone, e.g. based on Bluetooth or some other standardized or proprietary scheme).

The auxiliary device may be constituted by or comprise an audio gateway device adapted for receiving a multitude of audio signals (e.g. from an entertainment device, e.g. a TV or a music player, a telephone apparatus, e.g. a mobile telephone or a computer, e.g. a PC) and adapted for selecting and/or combining an appropriate one of the received audio signals (or combination of signals) for transmission to the hearing aid.

The auxiliary device may be constituted by or comprise another hearing aid. The hearing system may comprise two hearing aids adapted to implement a binaural hearing system, e.g. a binaural hearing aid system.

An APP:

In a further aspect, a non-transitory application, termed an APP, is furthermore provided by the present disclosure. The APP comprises executable instructions configured to be executed on an auxiliary device to implement a user interface for a hearing device, e.g. a hearing aid, or a (first or second or further) hearing system described above in the 'detailed description of embodiments', and in the claims. The APP may be configured to run on cellular phone, e.g. a smartphone, or on another portable device allowing communication with said hearing aid or said hearing system.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

The figures are schematic and simplified for clarity, and they just show details which are essential to the understanding of the disclosure, while other details are left out. Throughout, the same reference signs are used for identical or corresponding parts.

Figure 1A:
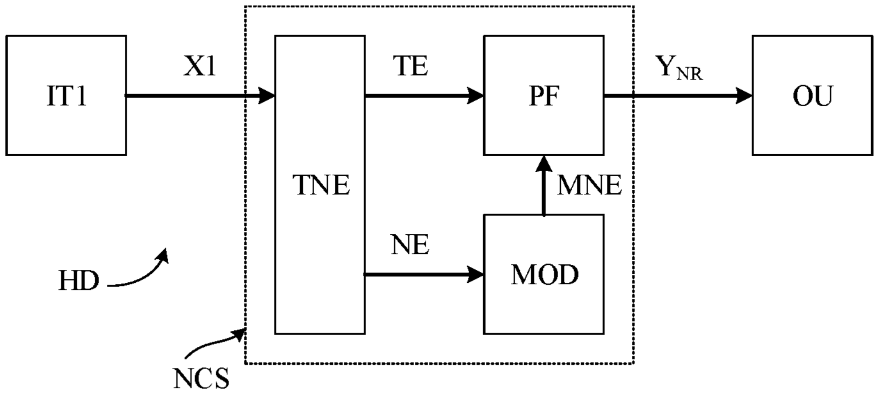
FIG. 1A, 1B, 1C shows simplified block diagrams of first, second and third embodiments of a hearing device according to the present disclosure.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION OF EMBODIMENTS

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include micro-electronic-mechanical systems (MEMS), integrated circuits (e.g. application specific), microprocessors, microcontrollers, digital signal processors (DSPs), field programmable gate arrays (FPGAs), programmable logic devices (PLDs), gated logic, discrete hardware circuits, printed circuit boards (PCB) (e.g. flexible PCBs), and other suitable hardware configured to perform the various functionality described throughout this disclosure, e.g. sensors, e.g. for sensing and/or registering physical properties of the environment, the device, the user, etc. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The present application relates to the field of hearing devices, e.g. hearing aids or headsets or combinations thereof.

In the present disclosure, it is proposed to impose a perceptible statistical structure on the background sound signal, e.g. to modify the background sound signal such that its statistical regularity over time is increased, in order to improve auditory object formation in hearing aid users. In some situations, this may have a negative effect on the overall SNR (by increasing the energy in the background sound). It may, however, have the overall positive effect of making multiple incohesive background sounds 'group together' more into an auditory texture, hence making the auditory scene simpler, and the task of attending to a foreground sound easier. This enhanced statistical structure may be provided in a number of ways, cf. e.g. two examples outlined below.

The present disclosure provides an improvement on previous solutions to dealing with background noise in hearing devices because, unlike further attenuation of the background noise, the proposed solution can improve the listener's perception of the target sounds with only minimal further limitations on the audibility of the surrounding auditory scene.

The technical means of the invention may include:

- A monoaural or binaural hearing device (e.g. a hearing aid or headset) or system comprising a noise reduction system, e.g. implemented as a multi microphone input beamformer, e.g. an MVDR beamformer and a (single channel) post filter, with two or more microphones on each device in a monaural solution and at least one microphone in each device in a binaural solution.
- An interface for activating the technology, either by the user's real-time choice, a prescribed program of the hearing device (or system), or by an automatic estimation of the complexity of the listening environment (e.g. provided by the hearing device (or system) itself, or optionally using external sensors or devices).
- One or more rhythmic patterns for object formation (e.g. optimized for object formation).
- A processor and algorithm to apply amplitude-modulation of the background noise.

Figure 1B:
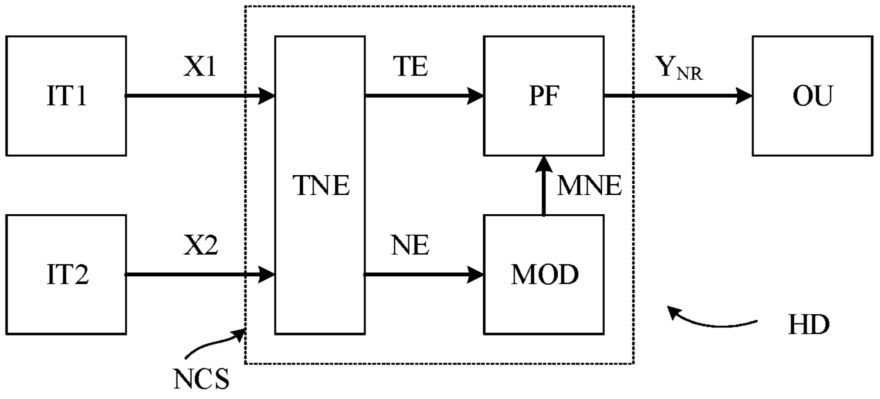
Figure 1C:
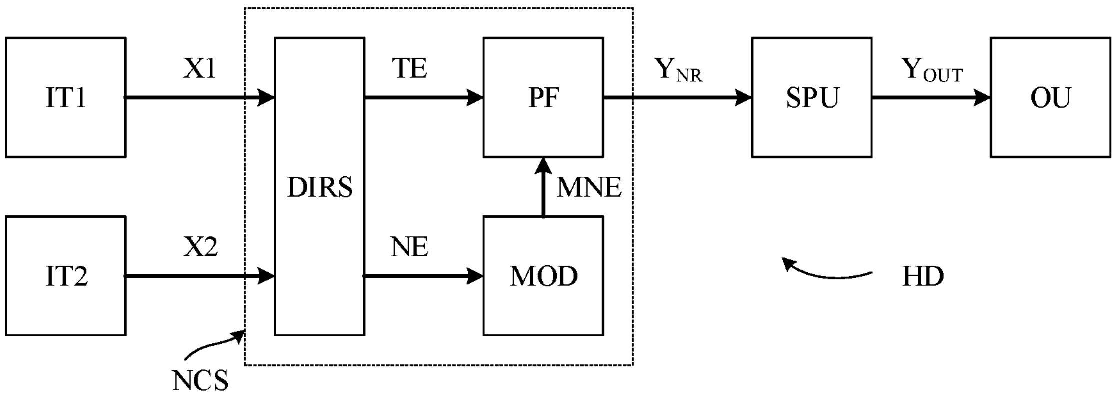

FIGS. 1A, 1B and 1C shows simplified block diagrams of first, second and third embodiments of a hearing device according to the present disclosure.

FIG. 1A shows a hearing system (according to the first aspect of the present disclosure) comprising a hearing device (e.g. a hearing aid) configured to be worn by a user, e.g. at or in an ear (or fully or partially implanted in the head of the user). The hearing device comprises an input transducer (IT1), e.g. a microphone, for providing at least one electric input signal (X1) representative of sound in the environment of the hearing device. The electric input signal (X1) comprises a) a target signal component assumed to be of current interest to the user, and b) a noise component. The hearing device further comprises an output unit (OU) configured to provide an output signal based on the at least one electric input signal (X1), either comprising stimuli for being presented to the user, and/or (a signal) for being transmitted to another device. The output unit (OU) may comprise an output transducer, e.g. a loudspeaker or a vibrator. The output unit (OU) may comprise an electrode array or a wireless transceiver. The hearing device further comprises a noise control system (NCS) configured to provide a noise reduced signal ($Y_{NR}$). The noise control system comprises a target-and-noise estimator (TNE) for providing an estimate of the target signal component (TE) and an estimate of the noise component (NE) in the at least one electric input signal (X1), or in a signal originating therefrom. The noise control system comprises a noise modifier (MOD) configured provide and apply a statistical structure to the noise component (NE) to thereby provide a modified noise component (MNE) comprising the statistical structure. The noise control system (NCS) id further configured to determine a modified estimate ($Y_{NR}$) of the target signal component (TE) in dependence of the modified noise component (MNE). The hearing system is configured to provide that the output signal (e.g. presented to the user) comprises the modified estimate ($Y_{NR}$) of the target signal component, or a further processed version thereof.

The noise modifier may modify the noise using either linear or non-linear processing. Also, the noise may be modified by adding another signal (with specific statistical properties) to the noise.

The embodiment of FIG. 1B exemplifies a hearing system according to the second aspect of the present disclosure. The hearing system consists of or comprises a hearing device (e.g. a hearing aid) configured to be worn by a user. The hearing device of FIG. 1B is similar to the embodiment of FIG. 1A, but comprises (at least) two input transducers instead of (at least) one (and the target and (at least a part of the) noise components may be provided by separate input transducers). The hearing device (HD, e.g. a hearing aid) comprises at least two input transducers (IT1, IT2) configured to provide respective at least two electric input signals (X1, X2) representative of sound. A first one (e.g. X1) of the at least two electric input signals comprises a target signal component assumed to be of current interest to the user. A second one (e.g. X2) of said at least two electric input signals comprises a noise component. The first electric input signal (X1) (comprising the target signal component) may originate from an audio receiver (the first input transducer IT1). The second electric input signal (X2) (comprising at least a part of the noise component) may originate from an acoustic to electric transducer (the second input transducer IT2). The target-and-noise estimator (TNE) provides an estimate of the target signal component (TE) in the first one of at least one electric input signal (xl) (or in a signal originating therefrom). The target-and-noise estimator (TNE) further provides an estimate of a noise component (NE) in the second one of at least one electric input signal (X1) (or in a signal originating therefrom). Hence the target component and the noise component (or at least a part thereof) are determined from two different electric input signals (end thus from two different input transducers).

Instead of an acoustic to electric transducer and an audio receiver, the at least two input transducers may comprise at least two acoustic to electric transducers, e.g. microphones and/or vibration sensors. The target signal component and (at least a part of) the noise component may be determined in dependence of the at least two electric input signals provided by the at least two acoustic to electric transducers. The target signal component and (at least a part of) the noise component may e.g. be determined from different acoustic to electric transducers, e.g. from a microphone relatively close to the target sound source and a microphone relatively far away from the target sound source, respectively.

The embodiment of FIG. 1C is similar to the embodiments of FIG. 1A or 1B. The following differences are: A. The hearing device (HD) comprises two input transducers (IT1, IT2), e.g. two microphones, providing respective first and second electric input signals (X1, X2) comprising sound from the environment of the user wearing the hearing device. B. The noise control system (NCS), e.g. the target-and-noise estimator (TNE), comprises a directional system (DIRS) comprising at least one beamformer (e.g. two beamformers) and configured to provide the estimate of the target signal component (TE) and the estimate of the noise component (NE), respectively, based on the first and second electric input signals (X1, X2).

C. The hearing device further comprises a signal processing unit (SPU) in the forward (audio) path, e.g. configured to apply one or more processing algorithms (e.g. to compensate for the user's hearing impairment) to the (noise reduced) signal ($Y_{NR}$) from the noise control system (NCS). The signal processing unit (SPU) provides a processed signal (Your) in dependence of the (noise reduced) signal ($Y_{NR}$). The output unit (OU) is configured to provide the stimuli of the output signal based on the processed signal ($Y_{OUT}$).

More specific embodiments are provided in FIGS. 2A, and 2B, and described further below.

Given current theories on auditory object formation, different patterns of background noise modulation are possible. In the present disclosure it is proposed to modify the background noise in order to render it more perceptually coherent, e.g. to specifically add modulation or specific signal characteristics into a noise pathway of a noise reduction system of the hearing device. Four suggestions include:

Method 1: Add Sound Textures to the Background Sound Signal.

The statistical structure which could be added to the background could take the form of an 'auditory texture' for example. Natural 'auditory textures' are sounds produced by the addition of many similar sound sources, such as the sound of a room full of people talking, or a swarm of bees, or of raindrops (cf. e.g. [McWalter & McDermott; 2019]). These sound textures tend to be stable over fairly long periods of time and, although they are complex in the sense that they are formed from many individual sources, they tend to be perceived as a single 'background' sound. Auditory textures can be characterized by low-order summary statistics (such as the between-channel correlations when the signal is passed through a filter bank of an auditory processing model), and can be synthesized by imposing these simple statistics on noise (cf. e.g. [McDermott & Simonelli; 2011]). Rather than modulating a pure noise source, the perception of auditory texture may be imposed on the noise signal in a hearing device, with the aim of rendering the noise signal more perceptually coherent. Modulations of some of these features (for example between-channel correlation structure) may be applied to the frequency-domain noise signal (cf. e.g. on the output of a target cancelling beamformer) in a hearing aid that employs MVDR noise reduction, resulting in a 'textured' background sound signal that may have the property of being perceived as a single background object rather than a complex background scene.

Furthermore, in a binaurally-connected hearing system, the IAC of the subsequent 'texturized background signal' could be manipulated so that it has an artificially lower IAC (by inter-aurally decorrelating some of the texture modulations for example). Natural 'background sounds' tend to have low inter-aural correlation because very different signals reach the two ears (they are reflected many times from different directions by the physical properties of the listening space). However, after a binaural beamformer is applied, the resulting 'noise' tends to be highly localized (which implies a high or constant level of IAC). If we apply the textures above separately to the two ears, we may 'break' this highly-coherent noise source and render it more diffuse, and potentially then easier for the brain to separate from target signals. The noise is not only highly localized—it tends to be localized from the same direction as the target, because the binaural beamformer yields more or less the same signal to be presented to both ears. This may e.g. be implemented by "randomizing" the phase of the time-frequency components which are dominated by the noise (cf. 'Method 4' below).

In addition, in order to make these imposed sound textures merge and be identifiable as a background sound rather than an additional foreground sound, the particular selection of modulations applied could be selected to correspond closely with the real background noise signal We can analyse the acoustic properties of the current background sound (spectral centroid, between-channel correlation etc.) and then apply a texture from a library of possible textures which has acoustic features that (fairly closely; e.g. best among a number of examples, e.g. from a library) match the natural environment. The analysis may e.g. be performed using a sound scene classifier. For example, in a noise-speech environment, apply the sound texture for 'babble background,' but if the noise is from outdoors, apply the 'rain' texture, etc. This option may also, at least in part, apply to 'Method 2' outlined below. The properties of the background sound can be compared to a library of sound textures to find one that has the best match with the acoustic properties of the natural environment.

Method 2: Add Regular Amplitude Modulation to the Background Sound.

The statistical structure applied to the background sound may also be a simple amplitude modulation in a rhythmic pattern. In other words, the statistical regularity may come from repeating a pattern of amplitude-modulation over time.

Because the brain is substantially attuned to detect patterns in sound, only minimal modification of the sound output may be necessary to achieve a listening improvement. Effective patterns for eliciting object formation can be inspired by previous research (e.g. [Aman et al.; 2021]), and further optimised for hearing aid users and their listening environments. The pattern can be accomplished across many different manipulations of the sound (e.g. how long the pattern takes before repeating, the min/max duration between the up/down and down/up segments of the amplitude modulation, the min/max levels in amplitude of the amplitude modulation). Due to their hearing loss, and how that loss interacts with different listening challenges (e.g. a train station, a canteen, inside a bus), the hearing aid users may be better/worse at perceiving patterns with different characteristics within that range of manipulations. A first example: Since hearing-aid users tend to be older and may have challenges to their working-memory, they need a pattern that takes only a small amount of time before repeating. A second example A hearing-impaired listener with greater hearing loss needs a larger change in the levels of the amplitude-modulation in order to perceive that it is changing in a pattern, and this means that the down/up to up/down period of the amplitude modulation has to be shorter to minimize the energetic masking that it adds. These patterns can be applied to the background sound estimate in a hearing aid that uses directional beamforming, see e.g. EP2701145A1.

Method 3: Addition of Textured Noise to Monaural Noise Reduction Stage.

In addition to the modifications to the 'noise signal' in the beamformer as described above, it may also be possible to add textured noise to the time-frequency regions that are attenuated in the monaural noise reduction stage (e.g. in the noise control system) of the hearing device.

Normally, the noise reduction system finds time-frequency regions in the signal where the noise is more energetic than the target signal, and then attenuates those regions by a small amount (for example 7 dB) in order to avoid introducing 'musical tones' that occur with more aggressive noise attenuation. The amount of attenuation may depend on e.g. SNR, type of background noise, or frequency resolution. It is proposed to attenuate noisy regions more aggressively, e.g. attenuating by 20 dB, but e.g. also to add 'textured' background noise to the specific time-frequency units, where we attenuated. In that way a more pleasant background noise, without audible artefacts, may be obtained for presentation to the listener.

In the case where noise is only added to low-SNR or level regions in time and in frequency, it may only be beneficial to add noise, if the amount of noisy regions is high (a minimum number of noisy regions are needed in order to allow the added noise to be grouped together).

Figure 2A:
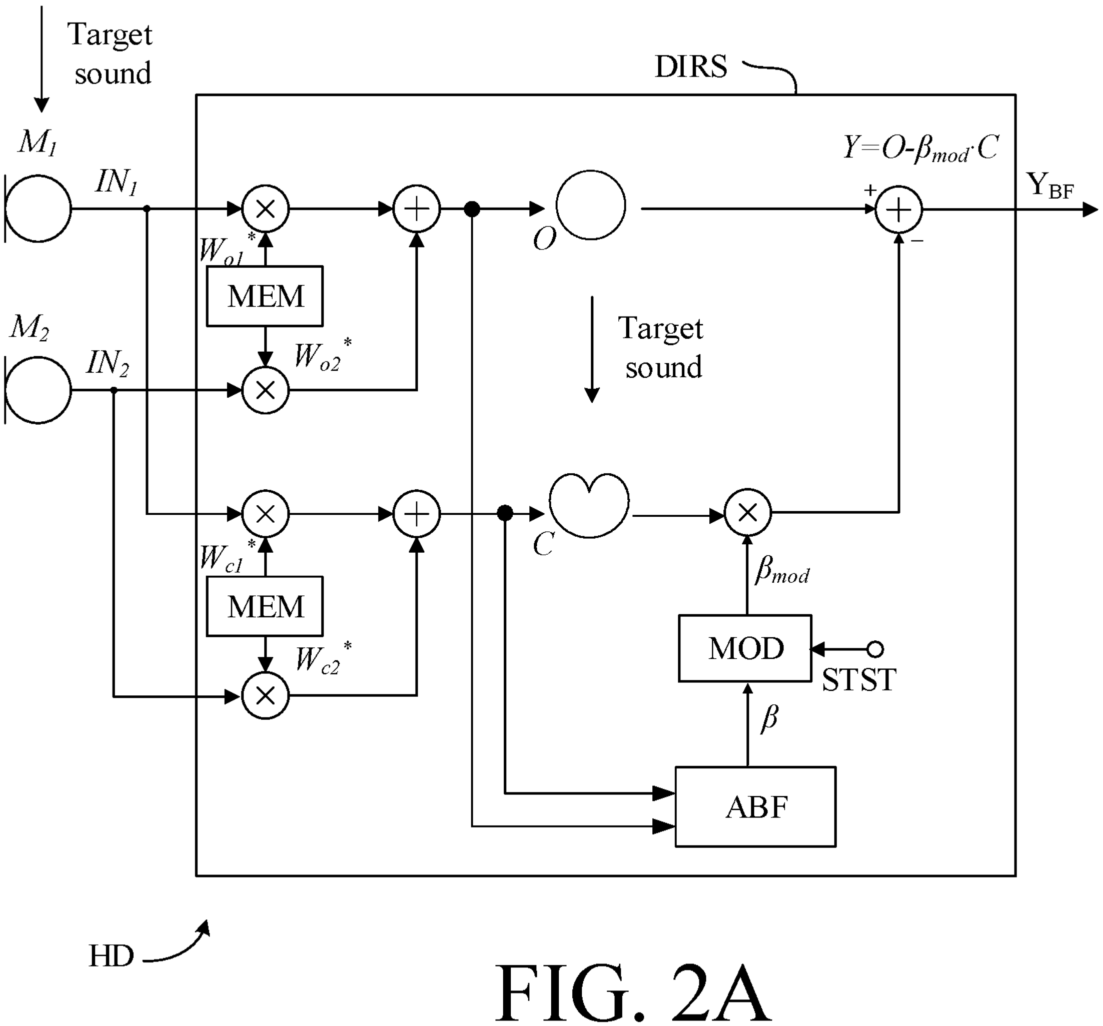
FIG. 2A, 2B shows two options for where a statistical structure, e.g. a rhythmic pattern of modulation over time, may be added to the processing pipeline of a single hearing aid with two microphones.
Figure 2B:
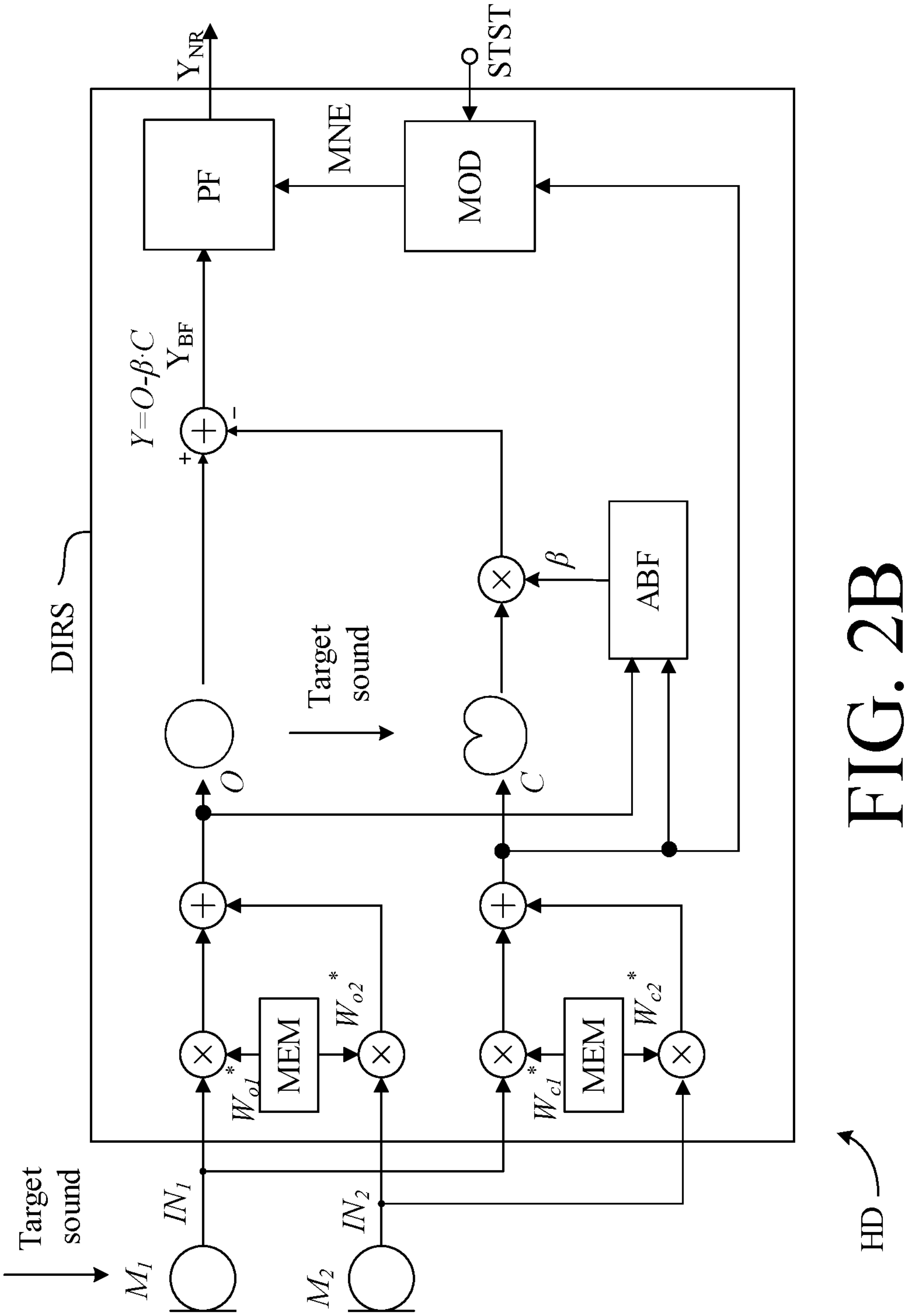

FIG. 2A, 2B shows two options for where a statistical structure, e.g. a rhythmic pattern of modulation over time, may be added to the processing pipeline of a single hearing aid with two microphones.

FIG. 2A, 2B each shows a part of a hearing aid comprising first and second microphones ($M_1$, $M_2$) providing respective first and second electric input signals $IN_1$ and $IN_2$, and a noise reduction system. The noise reduction system comprises a directional system (DIRS) providing a noise reduced (e.g. at least beamformed) signal $Y_{BF}$ based on the first and second electric input signals. A direction from the target signal to the hearing aid is e.g. defined by the microphone axis and indicated in FIG. 2A, 2B by arrow denoted Target sound. The target direction can be any direction in the environment. The target direction may e.g. be a direction to a speaker of interest in the user's environment. An adaptive beam pattern (Y (Y(k))), for a given frequency band k, k being a frequency band index, is obtained by linearly combining a delay-and-sum-beamformer (O(O(k))) and a delay-and-subtract-beamformer (C(C(k))) in that frequency band. The delay-and-sum-beamformer may e.g. have a substantially omni-directional characteristic, as indicated by the circular symbol denoted O in FIG. 2A, 2B. The delay-and-subtract-beamformer may e.g. have a characteristic of cancelling the target signal component (and being termed a 'target cancelling beamformer') as indicated by the cardioid symbol denoted C in combination with the target direction (cf. arrow denoted 'Target sound') in FIG. 2A, 2B. The first (omni-directional) and second (target-cancelling) beamformers (denoted O and C in FIG. 2A, 2B) provide beamformed signals O and C, respectively, as linear combinations of the first and second electric input signals $IN_1$ and $IN_2$, where first and second sets of (frequency dependent) complex weighting constants ($W_{o1}(k)$, $W_{o2}$ (k)) and ($W_{c1}(k)$, $W_{c2}(k)$) representative of the respective beam patterns are stored in memory unit (MEM). The complex weighting constants are applied to the first and second electric input signals via respective multiplication units ('×') and the weighted input signals are added (or subtracted) by respective sum-units ('+') as shown in FIG. 2A, 2B. The adaptive beam pattern arises by scaling the delay-and-subtract-beamformer (C(k)) by a complex-valued, frequency-dependent, adaptive scaling factor β(k) (generated by beamformer BF) before subtracting it from the delay-and-sum-beamformer (O(k)), i.e. providing the beam pattern Y.

$$Y(k)=O(k)-\beta(k)C(k).$$

It should be noted that the sign in front of β(k) might as well be +, if the sign(s) of the weights constituting the delay-and-subtract beamformer C are appropriately adapted. Further, β(k) may be substituted by β*(k), where * denotes complex conjugate, such that the beamformed signal $Y_{BF}$ is expressed as $Y_{BF}=(w_o(k)-\beta^*(k)\cdot w_c(k))^H\cdot IN(k)$.

An adaptive beamformer may also be obtained by linear combination of other beamformers.

Preferably, one of the beamformers represents a noise estimate (target cancelling beamformer).

The directional system (DIRS) may e.g. be adapted to work optimally in situations where the microphone signals comprise a localized target sound source (e.g. a target speaker) in the presence of additive noise sources. Given this situation, the scaling factor β(k) (β in FIG. 2A, 2B) is adapted to minimize the noise under the constraint that the sound impinging from the target direction (at least at one frequency) is essentially unchanged. For each frequency band k, the adaptation factor β(k) can be found in different ways. The solution may be found in closed form as $$\beta(k) = \frac{\langle C^* O\rangle}{\langle |C|^2\rangle},$$

where * denote the complex conjugation and ⟨ –⟩ denotes the statistical expectation operator, which may be approximated in an implementation as a time average, e.g. comprising a low-pass filter. The expectation operator ⟨ –⟩ may e.g. be implemented using a first order IIR filter, possibly with different attack and release time constants. Alternatively, the expectation operator may be implemented using an FIR filter.

The adaptive beamformer (BF) may be configured to determine the adaptation parameter $\beta_{opt}(k)$ from the following expression $$\beta_{opt} = \frac{w_O^H C_v w_C}{w_C^H C_v w_C},$$

where $w_o$ and $w_c$ are the beamformer weights for the delay and sum O and the delay and subtract C beamformers, respectively, $C_v$ is the noise covariance matrix, and H denotes Hermitian transposition.

Each of the embodiments of FIG. 2A, 2B comprises a different solution of applying a statistical structure to the noise component of the electric input signals ($IN_1$, $IN_2$) to thereby provide a modified noise signal component comprising the statistical structure. The application of a statistical structure may e.g. comprise one or more of a) applying modulation to the noise estimate, b) randomizing the phase of the noise estimate, c) applying auditory texture to the noise estimate.

In the embodiment of FIG. 2A the noise modifier (MOD) is located after the adaptive beamformer (ABF) providing the adaptive (noise attenuating) parameter β (or matrix β in case of more than two electric input signals), thereby providing a modified parameter $\beta_{mod}$ (or matrix $\beta_{mod}$) comprising the statistical structure. The applied statistical structure is provided by modification control signal (STST) or it may be a fixed feature of the noise modifier (MOD). In the embodiment of FIG. 2A, the modified adaptive parameter $\beta_{mod}$ is multiplied to the noise component (C) provided by the target cancelling beamformer. The resulting beamformed signal $Y_{BF}$ is based on the signal from the omnidirectional beamformer (comprising the target signal component and noise) and the noise component from the target cancelling beamformer multiplied by the modified adaptive (noise cancelling) parameter $\beta_{mod}$ to provide the noise reduced signal $Y_{BF}=O-\beta_{mod}C$.

The embodiment of FIG. 2B resembles the embodiment of FIG. 2A, where the noise modifier (MOD) is located after the target-cancelling beamformer, but in FIG. 2B the modified noise estimate (MNE, denoted $\beta_{mod}$ in FIG. 2A) is combined with the beamformed signal, e.g. in a combination unit, e.g. a sum unit or a multiplication unit, or more generally a filter. A (single channel) post filter (PF) may be inserted before or after the combination unit. The combination unit may form part of the post filter (PF) as shown in FIG. 2B.

Method 4: Binaural Beamforming and Addition of Textured Noise to Monaural Noise Reduction Stage (e.g. in the Noise Control System).

In general, the amount of noise added may depend on an overall sound level, or on the estimated signal to noise ratio (SNR) in the mixture, e.g. in situations with only little noise, it may not be necessary to add background noise compared to more difficult scenarios.

For a system with more than two microphones, noise estimates from more than one direction may be obtained with a generalized sidelobe canceller. If implemented in a binaural hearing aid system, the background noise estimates may be further modulated differently at each ear, to introduce a frequency-dependent interaural timing difference (or the phase of the background noises may be randomized in order to make the noise more diffuse). This may e.g. be accomplished in the sound processing pipeline after the sounds from the microphones have been filtered into separate frequency channels. Then, the signal carried by the frequency channel from the inputs of one hearing aid would be slightly delayed compared to the signal in the corresponding frequency channel of the other hearing aid, to simulate that this signal arrives at each ear with a delay.

The timing difference may e.g. be adjusted to simulate:

The laterality of the background noise. The "laterality" in this case is referencing from the hearing aid user's head. So sound signals can be simulated to have originated from either more to the left or more to the right of the listener's head's midline. This new directionality may help with the object formation of the background.

The directional diffusivity (the "size" of the sound source in space). Diffuseness may be quantified based on an estimated noise covariance matrix. If the noise between the microphones is highly correlated, it indicates that the noise is impinging from a single direction (i.e. the opposite of a diffuse noise source). In theory, more diffuse sounds are better classified as background by the brain, whereas less diffuse sounds are better perceived as objects.

As the binaural beamformer for both ears rely (at least partly) on the same input signals, the target and the remaining noise in the noise reduced signal will appear as if the target and the noise is co-located. Hereby the listener's ability to segregate the target from the remaining noise is degraded.

Figure 3:
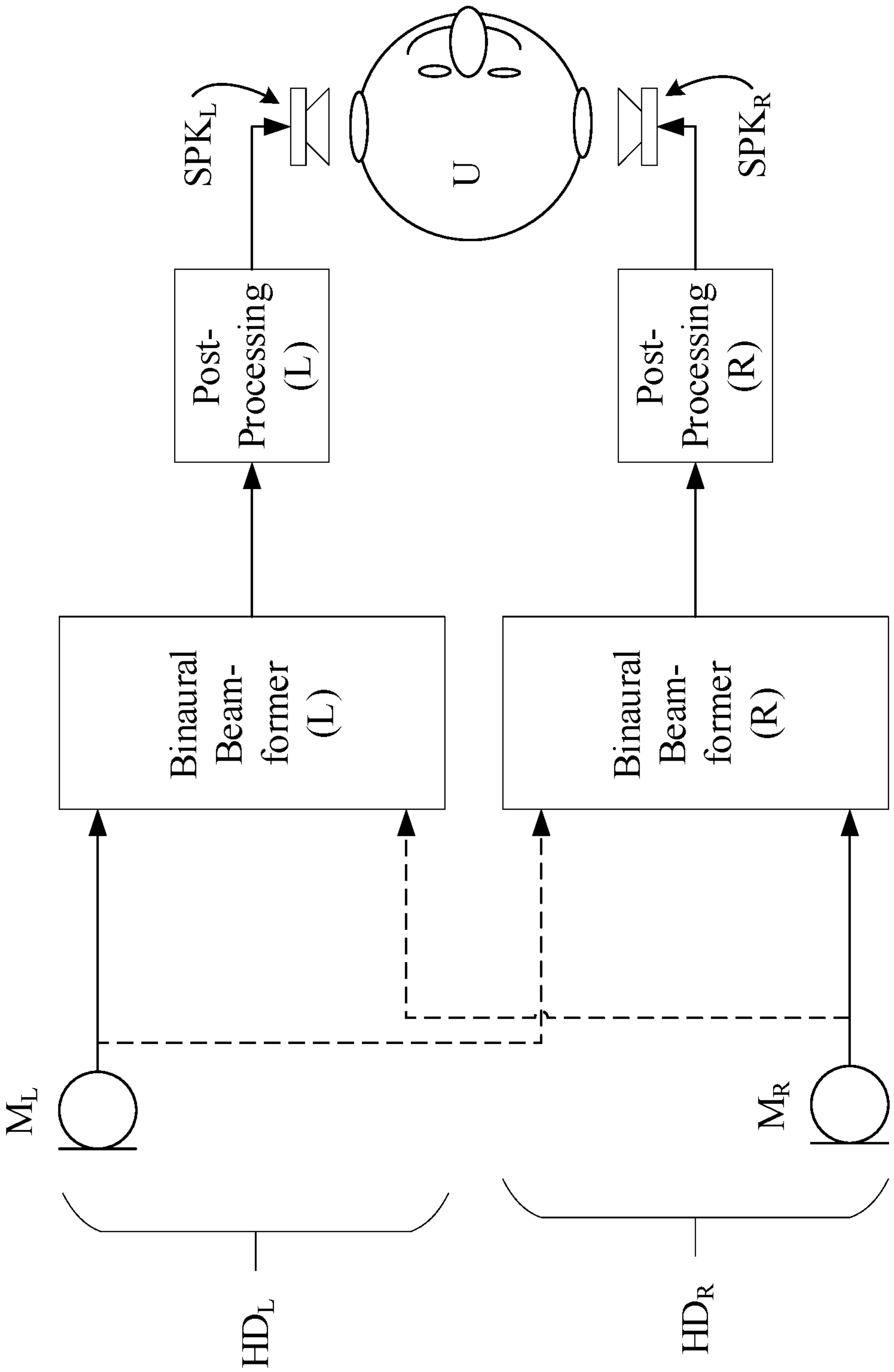
FIG. 3 shows an embodiment of a binaural hearing aid system according to the present disclosure.

FIG. 3 shows an embodiment of a binaural hearing aid system according to the present disclosure. The binaural hearing aid system comprises left and right hearing aids ($HD_L$, $HD_R$) as indicated by the brackets denoted '$HD_L$, $HD_R$' in the left part of FIG. 3. Each hearing aid comprises at least one microphone (her one in each hearing aid is indicated ($M_L$, $M_R$)). Each of the left and right hearing aids ($HD_L$, $HD_R$) comprises appropriate antennas and transceiver circuitry to establish a communication link between the two hearing aids (possibly via a third intermediate device, e.g. a processing device, e.g. a smartphone). The communication link may be configured to transmit and receive audio data, as indicated by dashed arrows from the left to the right and from the right to the left hearing device. Each hearing device may comprise more than one microphone. More than one microphone signal (or a part thereof, e.g. filtered or down-sampled versions thereof) may be exchanged between the left and right hearing aids ($HD_L$, $HD_R$). Each of the left and right hearing aids ($HD_L$, $HD_R$) comprises and noise control system comprising a binaural beamformer (Binaural Beamformer (L), Binaural Beamformer (R)). Each of the binaural beamformers gets as inputs a locally originating microphone signal and a microphone signal (or a filtered or down-sampled version thereof) received from the opposite hearing aid (via the communication link). Each of the binaural beamformers provides a binaurally beamformed signal which is fed to fed to a post processing unit (denoted Post-Processing (L) and Post-Processing (R) in the left and right hearing aids, respectively). The binaural beamformer or the post-processing unit of each of the left and right hearing aids may comprise a post filter for further reducing noise in the beamformed (spatially filtered) signal. The post-processing units of each of the left and right hearing aids are configured to apply one or more processing algorithms to the signal from the noise reduction system (e.g. from the binaural beamformer) and to provide a processed signal to an output transducer. The post-processing units may be configured to apply a frequency and/or level dependent gain to a signal for the forward (audio) path of the respective hearing aid, e.g. to compensate for a hearing impairment of the user. In the embodiment of FIG. 3, the output transducer is a loudspeaker (denoted $SPK_L$, $SPK_R$ in the left and right hearing aids, respectively) configured to play processed sound to the respective left and right ears of the user (U). The left and right hearing aids are thus air conduction hearing aids. They may, however, be or comprise bone conduction hearing aids or cochlear implant type hearing aids (or a combination thereof).

In order to ease the listener's ability to segregate speech from the noise (according to the present disclosure), further processing may be applied (here shown as a post-processing block in FIG. 3). The post-processing may contain a single channel noise reduction system, which is able to identify regions (in time and frequency) where either the target signal or the background noise is dominant. The post-processing block may have more inputs compared to what is shown in the FIG. 3. Such additional input may be: a noise estimate e.g. from a target cancelling beamformer; also a voice activity detector may be used to identify whether target or background noise dominate the time-frequency unit. In the time-frequency units, where noise is dominant, further noise reduction may be applied, e.g. in terms of a gain reduction.

Furthermore, the phase of the (complex) time frequency tile may be altered (by multiplying the signal with a "random" or a "pseudorandom" phase change (by a multiplication to the signal by $\exp(j\varphi)$)). The phase $\varphi$ may e.g. be a altered such that the noise will appear from a different direction than the target (this may also be obtained by applying a different HRTF for left and right ear (here also the amplitude may be altered)). The phase may also be randomized such that the noise field becomes diffuse (e.g. a spherically diffuse noise field or a cylindrically diffuse noise field, see examples below). This can be obtained by for each instrument ($HD_L$, $HD_R$) drawing the angle $\varphi$ from a different random distribution (where the maximum and the minimum $\varphi$ corresponds to the maximum possible delay depending on the microphone distance As the maximum delay between the two microphones is given by $\exp(-j2\pi\cdot d/c)$, where d is the microphone distance and c is the sound velocity, and f is the frequency; φ should be in the interval given by [−π·f·d/c; +π·f·d/c]).

Examples of Conversion of Co-Located Background Noise to Binaural Diffuse Noise

Regarding the conversion of co-located background noise into binaural diffuse noise, an example of converting the noise into a cylindrical or spherical diffuse noise field by (for each frequency unit) multiplying the noisy time frequency unit by a random phase is provided in the following.

As the horizontal angles in a cylindrical noise field are equally likely, we can for each frequency band draw the angles from a uniform distribution. However, having a uniform distribution of angles does not mean that the phase is uniformly distributed. In a free-field cylindrically diffuse noise field, the phase difference between two microphones is given by $$\varphi = \frac{2\pi f d\cos(\Theta)}{c}$$

where f is the frequency, d is the microphone distance, c is the sound velocity, and Θ is a uniformly random distribution in the interval [0, 2π] (or [0, π], as the noise field is symmetric).

By for each time and frequency unit (t,f) dominated by noise multiplying exp(−iφ(t,f)), where $i=\sqrt{-1}$, we can convert the background noise into a diffuse noise signal with a desired coherence function.

Figure 4A:
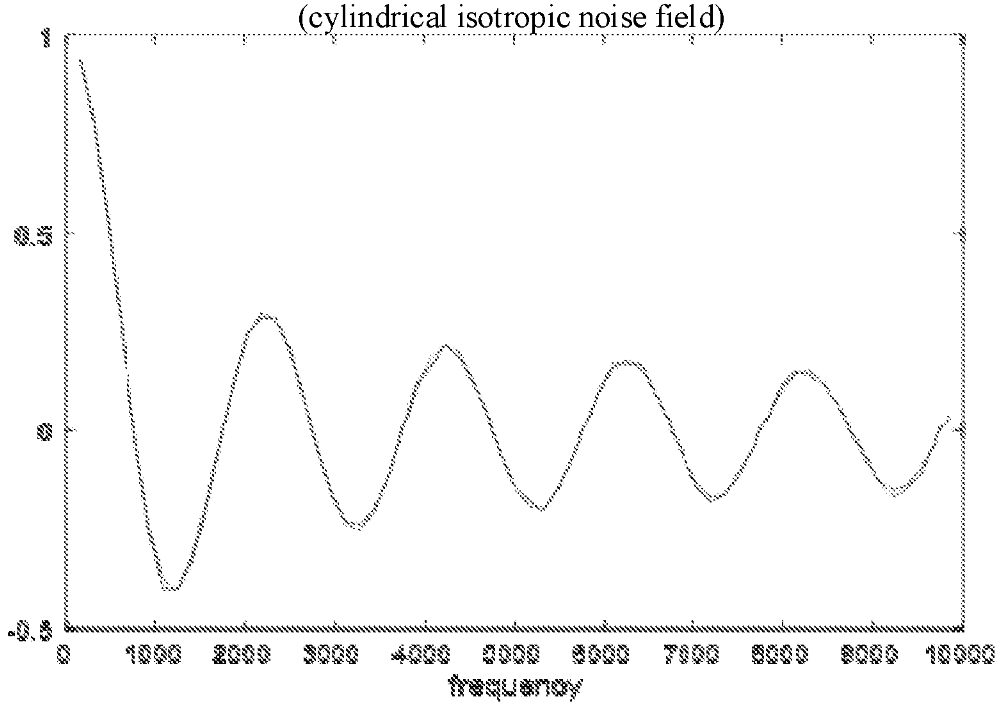
FIG. 4A shows the estimated coherence function as well as the true coherence between two microphones as a function of frequency for a cylindrical isotropic noise field.

FIG. 4A shows the estimated coherence function as well as the true coherence between two microphones as function of frequency for a cylindrical isotropic noise field. In a cylindrically isotropic noise field the coherence between two microphones is given by $B_0(2\pi fd/c)$, where $B_0$ is a Bessel function of $0^{th}$ order. In the plot of FIG. 4A, d=0.17 m and c=340 m/sec.

In a similar way, we may convert the background noise into other diffuse noise fields, such as e.g. a spherically isotropic noise field.

The formula for generating the random phase in a spherically isotropic noise field may be expressed as:

$$\varphi(t,f)=\cos(\Theta)\sin(\cos^{-1}(U))$$

here O is a uniformly random distribution in the interval [0; 2π] (or [0; π]) and U is a uniformly random distribution in the interval [−1,1]. In this case the noise should be multiplied by exp(−iφ(t,f)), where $i=\sqrt{-1}$.

Figure 4B:
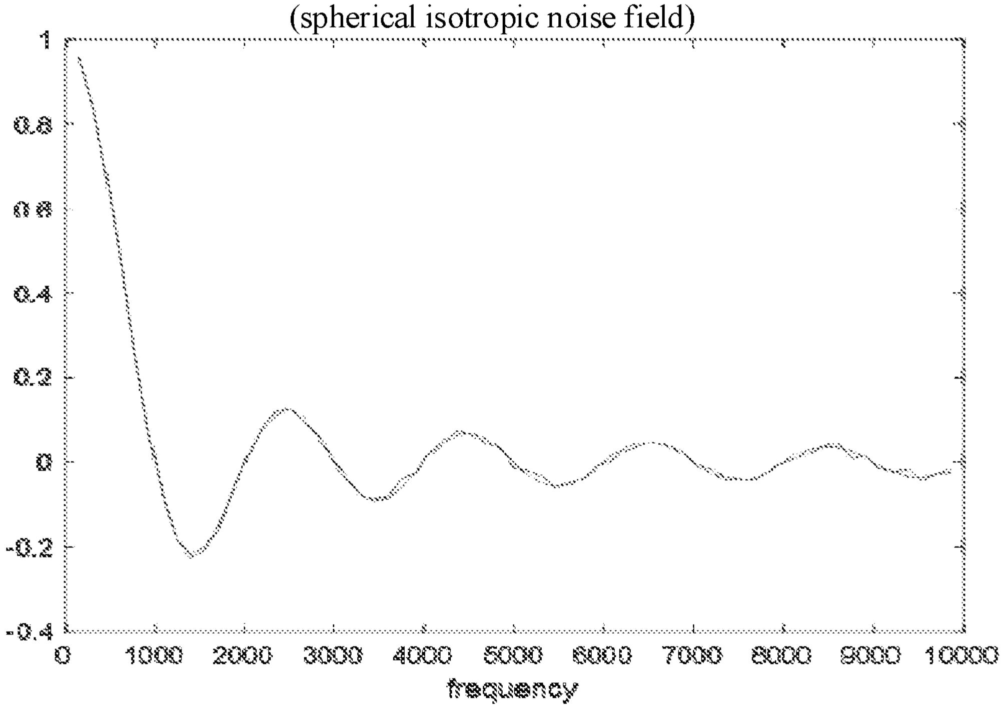
FIG. 4B shows the estimated coherence function as well as the true coherence between two microphones as a function of frequency for a spherically isotropic noise field.

FIG. 4B shows the estimated coherence function as well as the true coherence between two microphones as function of frequency for a spherically isotropic noise field (given by a sin(2πfd/c)/(2πfd/c)). In the plot of FIG. 4B, d=0.17 m and c=340 m/sec.

It may be advantageous to take into account that the phase between two consecutive frames may be correlated due to frame overlap in the filter bank.

An advantage of the proposed method is that the random phase may be applied without exchanging information about the phase between the two hearing instruments of a binaural system.

The phase randomization may be applied solely on one side, or the phase randomization may be applied to both hearing instruments, where each random distribution will be drawn such that the correlation between the microphones follows the distribution for e.g. spherically isotropic noise.

Cylindrically and spherically isotropic noise fields are two very specific idealized noise fields. Other noise fields may be considered.

The phase randomization may be applied solely above a threshold frequency, e.g. 1500 Hz. These types of phase modification may be applied as a tinnitus masker.

Embodiments of the disclosure may, e.g., be useful in applications such as hearing aids or headsets.

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element, but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method are not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure.

The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more.

REFERENCES

[Aman et al.; 2021] Aman L, Picken S, Andreou L V, Chait M., *Sensitivity to temporal structure facilitates perceptual analysis of complex auditory scenes*. Hearing Research. 2021, Feb. 1; 400:108111.

[Mishra et al.; 2021] Mishra A P, Harper N S, Schnupp J W H (2021), *Exploring the distribution of statistical feature parameters for natural sound textures*. PLoS ONE 16(6):e 0238960. https://doi.org/10.1371/journal.pone. 0238960.

[McWalter & McDermott; 2019] McWalter, R., McDermott, J. H., *Illusory sound texture reveals multi-second statis-*

*tical completion in auditory scene analysis*. Nat. Commun 10, 5096 (2019). https://doi.org/10.1038/s41467-019-12893-0.

[McWalter and McDermott; 2018] McWalter, R. I. & McDermott, J. H., *Adaptive and selective time-averaging of auditory scenes*. Curr. Biol. 28, 1405-1418 (2018).

[McDermott & Simoncelli; 2011] McDermott J H, Simoncelli E P, *Sound texture perception via statistics of the auditory periphery: evidence from sound synthesis*. Neuron. 2011; 71(5): 926-940. https://doi.org: 10.1016/j.neuron. 2011.06.032.

EP2701145A1 (Oticon) 26.02.2014.

JP2010200260A (Yamaha) 09.09.2010.

The invention claimed is:

1. A hearing system comprising

A hearing device configured to be worn by a user, the hearing device comprising

At least one input transducer for providing at least one electric input signal representative of sound in the environment of the hearing device, wherein said at least one electric input signal comprises a) a target signal component assumed to be of current interest to the user, and b) a noise component;

An output unit configured to provide an output signal based on said at least one electric input signal, either comprising stimuli for being presented to the user, and/or for being transmitted to another device;

A noise control system configured to provide an estimate of said target signal component and an estimate of said noise component in said at least one electric input signal, or in a signal originating therefrom;

wherein the noise control system is further configured to apply a statistical structure to said estimate of said noise component to thereby provide a modified noise component comprising said statistical structure; and to determine a modified estimate of said target signal component in dependence of said modified noise component, and wherein said output signal comprises said modified estimate of said target signal component, or a further processed version thereof.

2. A hearing system according to claim 1 wherein said noise control system is configured to apply said statistic structure to said noise component by modulation.

3. A hearing system according to claim 1 wherein said statistical structure is constituted by or comprises auditory texture in the form of sounds produced by the addition of a multitude of similar sound sources.

4. A hearing system according to claim 1 wherein said statistical structure is constituted by or comprises amplitude modulation in a rhythmic pattern.

5. A hearing system according to claim 1 wherein said at least one input transducer comprises a multitude of input transducers, each providing an electric input signal representative of sound in the environment of the hearing device, and wherein said noise control system comprises a directional system comprising at least one beamformer configured to receive as inputs said multitude of electric input signals, or signals originating therefrom, and to provide an estimate of said target signal component in dependence of said inputs and predefined or adaptively updated beamformer weights.

6. A hearing system according to claim 5 wherein said directional system comprises a linear constraint minimum variance (LCMV) beamformer.

7. A hearing system according to claim 5 wherein said at least one beamformer comprises first and second beamformers, wherein said first beamformer comprises said target signal component, and wherein said second beamformer is a target-cancelling beamformer comprising said noise component.

8. A hearing system according to claim 7 wherein said statistical structure is applied to said noise component in that the statistical structure is added directly to the noise component (i.e. the noise component itself is modified); and/or in that the statistical structure is added to the noise component in combination with other processing done on the noise component; and/or in that the statistical structure is added to the noise component and added to the output signal, after the original noise component provided by the second beamformer has been removed from the target signal component signal provided by the first beamformer.

9. A hearing system according to claim 1 comprising at least one analysis filter bank for providing said at least one electric input signal in a time frequency representation (k,l), where (k,l) represents a time-frequency tile, and k is a frequency index and l is a time index.

10. A hearing system according to claim 9 wherein auditory texture is added to time-frequency regions that are attenuated in the noise control system of the hearing device.

11. A hearing system according to claim 1 comprising an auxiliary device wherein a part of the processing of the hearing system is performed.

12. A hearing system according to claim 1 being constituted by the hearing device.

13. A hearing system according to claim 1 wherein the hearing device is constituted by or comprises a hearing aid or first and second hearing aids of a binaural hearing aid system, or a headset, or a combination thereof.

14. A hearing system according to claim 1 comprising a further hearing device, wherein the hearing device and the further hearing device each comprise appropriate antenna and transceiver circuitry allowing them to exchange data, either directly or via an auxiliary device.

15. A hearing system according to claim 14 when dependent on claim 9 configured to provide that the phase of the complex time frequency tile of the at least one analysis filter bank of a given hearing device may be altered by multiplying the at least one electric input signal with a random or a pseudorandom phase.

16. A method of operating a hearing system comprising a hearing device configured to be worn by a user, the method comprising providing at least one electric input signal representative of sound in the environment of the hearing device, wherein said at least one electric input signal comprises a) a target signal component assumed to be of current interest to the user, and b) a noise component;

providing an output signal based on said at least one electric input signal, either comprising stimuli for being presented to the user, and/or for being transmitted to another device;

providing an estimate of said target signal component and an estimate of said noise component in said at least one electric input signal, or in a signal originating therefrom, applying a statistical structure to said estimate of said noise component to thereby provide a modified noise component comprising said statistical structure; and determining a modified estimate of said target signal component in dependence of said modified noise component, and providing that said output signal comprises said modified estimate of said target signal component, or a further processed version thereof.

17. A computer program comprising instructions which, when the program is executed by a computer, cause the computer to carry out the method of claim 16.

18. A hearing system comprising a hearing device configured to be worn by a user, the hearing device comprising at least two input transducers configured to provide respective at least two electric input signals representative of sound, wherein at least one of said at least two electric input signals comprises a) a target signal component assumed to be of current interest to the user, and wherein at least one of said at least two electric input signals comprises b) a noise component;

an output unit configured to provide an output signal independence of said at least two electric input signals, either comprising stimuli for being presented to the user, and/or for being transmitted to another device;

a noise control system configured to provide an estimate of said target signal component and an estimate of said noise component in said at least two electric input signals, or in a signal or signals originating therefrom;

wherein the noise control system is configured to apply a statistical structure to said estimate of said noise component to thereby provide a modified noise component comprising said statistical structure; and to determine a modified estimate of said target signal component in dependence of said modified noise component, and wherein said output signal comprises said modified estimate of said target signal component, or a further processed version thereof.

19. A hearing system according to claim 18 wherein the at least two input transducers comprise at least one acoustic to electric transducer each being configured to provide an electric input signal comprising sound from the environment of the user wearing the hearing system and an audio receiver configured to provide an electric input signal representing sound received from another device or system.

20. A hearing system according to claim 19 wherein the target signal component originates from the electric input signal provided by the audio receiver, and wherein at least a part of the noise component originates from the electric input signal provided by the at least one acoustic to electric transducer.

* * * * *